Feb. 20, 1934.   H. F. FRUTH ET AL   1,947,548
APPARATUS FOR TREATING MATERIALS
Filed Oct. 15, 1931   2 Sheets-Sheet 1
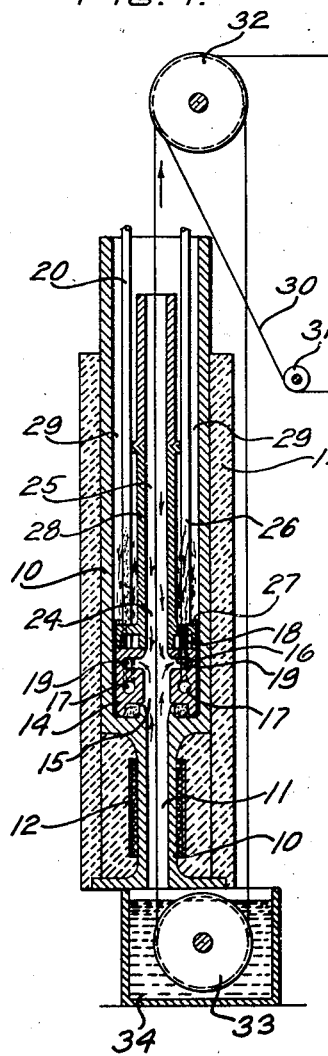
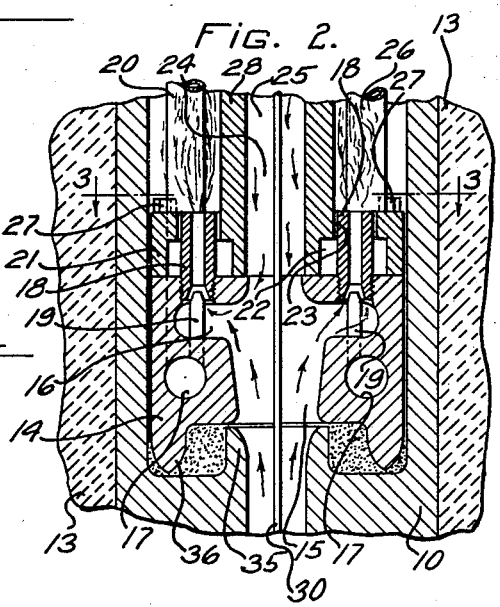
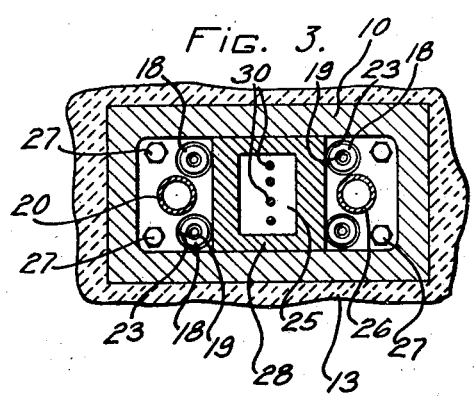
INVENTORS
H. F. FRUTH
R. L. READING
BY H. R. Whitehorn
ATTORNEY Feb. 20, 1934.　　H. F. FRUTH ET AL　　1,947,548
APPARATUS FOR TREATING MATERIALS
Filed Oct. 15, 1931　　2 Sheets-Sheet 2
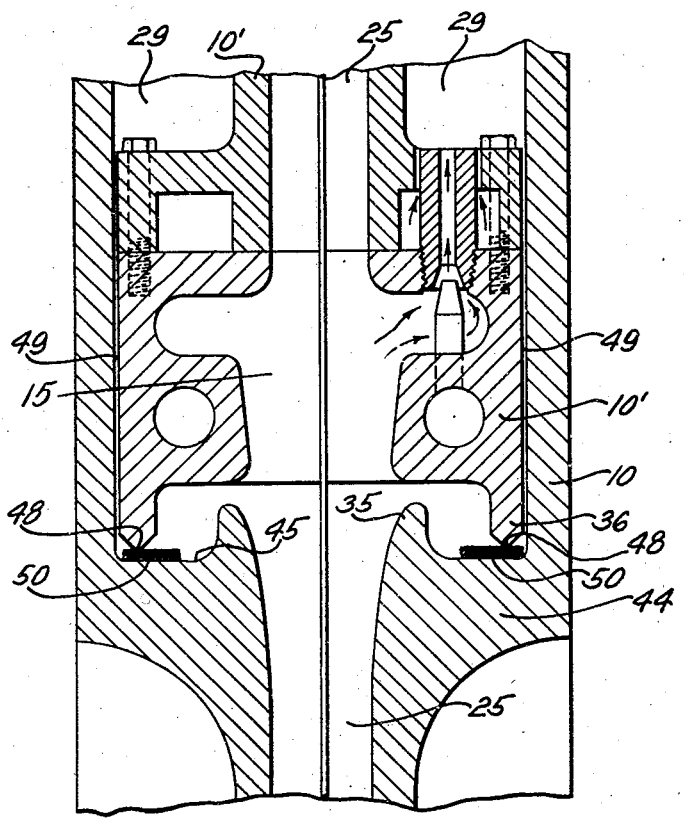
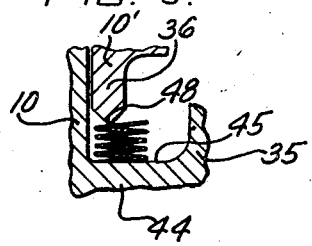
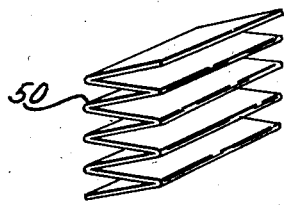
INVENTOR
H. F. Fruth
R. L. Reading
BY H. Q. Whitehorn
ATTORNEY Patented Feb. 20, 1934

1,947,548

UNITED STATES PATENT OFFICE 1,947,548

APPARATUS FOR TREATING MATERIALS

Hal F. Fruth, Chicago, and Raymond L. Reading, Maywood, Ill., assignors to Western Electric Company, Incorporated, New York, N. Y., a corporation of New York Application October 15, 1931. Serial No. 568,987

11 Claims. (Cl. 263—3)

This invention relates to an apparatus for treating materials and more particularly to an apparatus for treating materials applied to a filiform core.

An object of the invention is to provide a simple and effective apparatus for heating a coating applied to a filiform core, such as a strand or ribbon, and in particular for baking a coat of enamel on wire.

In one embodiment of the invention a tubular oven is provided having in continuous sequence a vaporizing zone and a baking zone and having a combustion chamber adjacent to or surrounding the baking zone. When a wire coated with raw enamel containing a volatile combustible ingredient is passed through the oven, the volatile ingredient is vaporized in the vaporizing zone. Means are provided to draw off the vapors thus evolved into the combustion chamber and to mix with them the necessary air for combustion, together with additional gaseous fuel if necessary. This mixture is burned in the combustion chamber to provide the heat for the baking zone of the oven.

This embodiment of the invention is further provided with details of construction which render the apparatus demountable in simple and easy fashion for cleaning or eventual repair.

Another embodiment of the invention makes use of an accordion pleated sealing strip of elastic, resistant metal interposed between and compressed by a flat face on one of two abutting parts and a sharp edge on the other.

Other objects and features of the invention will be apparent from the following detailed description and from the appended drawings, in which Fig. 1 is a longitudinal, central section of an apparatus presenting one embodiment of the invention;

Fig. 2 is an enlarged, similar broken view of the upper portion of the vaporizing zone;

Fig. 3 is a horizontal section on the line 3—3 of Fig. 2;

Fig. 4 is an enlarged fragmentary view in central longitudinal section of an oven similar to Fig. 2 showing a joint between the demountable parts having a modified form of seal;

Fig. 5 is a fragment of the view of Fig. 4 showing the oven parts slightly separated and the elastic sealing member partly expanded; and Fig. 6 is a detached perspective view of the sealing member.

In carrying out the invention as illustrated in Figs. 1 to 3, there is employed a substantially tubular inner casing 10 of some appropriate heat resistant and heat conductive material, such as cast iron, cast aluminum, molded clay, alundum or the like. The lower part of the casing 10 is constricted to form a vaporizing zone 11 and is surrounded by an electrical resistance heating element 12 connected to a source of electrical current (not shown). The whole inner casing 10 is surrounded by an outer casing 13 of some appropriate heat insulating material, such as an asbestos cement or the like. Above the vaporizing zone 11, the inner casing 10 is expanded as shown in Figs. 1 and 2 to receive the parts now to be described.

In the bottom of the expanded part of the inner casing is positioned an air manifold body 14 having a central bore 15 in alignment with and a trifle larger than the bore of the tubular vaporizing zone 11. Near its upper end the bore of the manifold is laterally enlarged to form a vapor intake 16. Below the outer periphery of the vapor intake 16 is an air feed inlet 17 which extends horizontally substantially around within the air manifold body 14. The roof of the vapor intake 16 is perforated at appropriate intervals and threaded to receive inspirator tubes 18 which extend above the upper surface of the air manifold body into a combustion chamber 29. An inspirator nozzle 19 mounted in the air manifold body is provided to coact with each of the inspirator tubes 18. The inspirator nozzles communicate with and are fed by the air inlet 17, which in turn is supplied with air from a source (not shown) through an air supply tube 20.

On the upper surface of the air manifold body 14 is supported a gas manifold body 21 having therein a gas feed inlet 22. The roof of the inlet 22 is provided with apertures 23 through which the inspirator tubes 18 pass to reach the combustion chamber 29. These apertures 23 are larger than the tubes 18, thus affording passage for gas from the inlet 22 around the tubes 18 to the combustion chamber. The gas manifold body 21 has a central bore 24 in alignment with the central bore 15 of the air manifold and forming the entrance to an elongated baking chamber 25. The gas inlet 22 is fed with fuel gas or air or an appropriate mixture of both as circumstances may require through a supply tube 26 from a source (not shown). The floor of the gas inlet 22 is formed by the top surface of the air manifold body 14. The gas manifold body 21 and the air manifold body 14 are fastened together by any suitable means, here shown as screws 27—27.

Integral with the gas manifold body 21 and extending upwardly therefrom is the tubular wall 28 of the baking chamber 25. The annular space 29—29 between the walls 28 and 10 above the gas manifold body 21 constitutes the combustion chamber of the apparatus.

In operation a wire 30 is drawn from a supply (not shown), passes under a tension pulley 31 over one of a plurality of sheaves 32 located above the oven, down outside the oven and under one of a plurality of sheaves 33 immersed in a bath 34 of raw enamel containing a volatile combustible ingredient, such as gasoline, benzol, alcohol, acetone, or the like. From the sheave 33, the wire passes up through the continuous tube formed by the vaporizing zone 11, the manifold bodies 14 and 21 and the baking chamber walls 28, to a second sheave 32 and thence to a take-up or spooling device not shown. If it be desired to give the wire more than one coat of enamel, it is passed from the second sheave 32 down beside its former path to a second sheave 33 and up through the apparatus a second time to a third sheave 32 and this is repeated as often as may be deemed desirable. Fig. 3 shows the wire passing through four times. Alternatively, a plurality of strands may be operated or simultaneously drawn from an equal plurality of supplies.

As the wire, coated with raw enamel from passing under a sheave 33, passes through the vaporizing zone 11 and is exposed to heat derived from the heater 12, the volatile combustible ingredient of the enamel is vaporized. The vapors thus evolved are drawn into the combustion chamber 29 by the inspirator action of air rushing under pressure from the supply 17 through the nozzles 19 and the tubes 18. There it mixes with the air from the nozzles 19 and also, as may be requisite, with additional air or gaseous fuel or both supplied through the annular apertures 23 from the gas manifold supply 22, and is burned to supply heat to the walls 28 of the baking chamber 25, in which the treatment of the enamel on the wire passing through is completed.

When the oven is first started, substantially the entire heating fuel is supplied from the gas manifold 22 through apertures 23 since the oven when cold will not vaporize a sufficient amount of the volatile ingredient of the enamel coating on the wire. After the oven has reached its operating temperature, the gas supply may in most instances be shut off completely.

At the operating temperature of the oven the surfaces of the walls 28 and 10 in the combustion chamber reach such a temperature as to cause the flame of combustion of the vapors of the volatile combustible ingredient to disappear and the combustion of the vapors continues by a sort of volume combustion resembling a flameless glowing. The best results are obtained when the flame completely disappears, although very good results may be had with a small flame present.

As shown here, the products of combustion escape into the open from the top of the combustion chamber. It is easily seen, however, that the top of the combustion chamber might be roofed over and the chamber connected to an exhaust flue if desirable.

As the supply tubes 20 and 26 pass down through the combustion chamber, it is evident that the air and auxiliary fuel, if any, are preheated in the tubes 20 and 26 before being fed to the combustion zone at the bottom of the chamber 29.

At the upper end of the vaporizing zone 11, the floor of the expanded inner space of the inner casing 10 is formed with an upwardly extending, integral, annular lip 35 surrounding the central bore. The bottom face of the air manifold body 14 is formed with a corresponding downwardly extending, integral, annular lip of internal diameter larger than the external diameter of the lip 35. The annular channel or groove between the lip 35 and the wall of the expanded part of the casing 10 is filled with a seal of suitable heat resistant material, such as sand, to prevent the escape of vapor between the parts of the wall of the central bore.

If it be desired to demount the parts of the apparatus for repair or cleaning or replacement of parts, upward traction on the wall 28, or on its lowest section, if made in sections, will lift the gas manifold body 21, it being integral therewith. As the air manifold body 14 is fastened to the gas manifold body 21 by the screws 27 and as all the air and gas supply parts are in or on one or the other manifold body, all these latter accompany the body 21 and may be removed with it through the top of the inner casing 10. When they are replaced in similar fashion, the lip 36 of the air manifold body sinks again into the sealing material around the lip 35 re-establishing the vapor seal between the manifold and the inner casing.

Referring now to Figs. 4 to 6 illustrating a modified form of seal, the oven, as in the preferred form, comprises a casing having two or more telescopically interfitting tubular parts 10 and $10^1$, the part $10^1$ sliding telescopically within the part 10 to delimit a central vaporizing and baking chamber 25—25 and an annular combustion chamber 29 surrounding a part of the chamber 25—25 and lying between the upper portions of the tubular parts 10 and $10^1$.

The part 10 has an inner integral ledge or shoulder 44 formed with an upward facing groove 45 between the outer wall of the tube 10 and an inner lip 35 upstanding from the inner edge of the shoulder 44.

The part $10^1$ is formed at its bottom end with a downwardly projecting lip or flange 36 whose extremity is cuneately sharpened as at 48.

Small spaces 49—49 may be provided between the outer lateral surface of the tube $10^1$ and the inner face generally of the tube 10 to allow for differential expansion of the parts over a large range of temperature.

In order to shut off escape of gas and vapor through the crevices 49, sealing strips of elastic heat resistant metal 50—50, such as nichrome, chrome-steel or the like, are folded into accordion pleats as shown in Fig. 6 and laid on the floor of the groove 45 before the tube $10^1$ is inserted into the tube 10. Tube $10^1$ is then slid into place as shown in Fig. 5 and gradually compresses the seal 50 to the condition shown in Fig. 4, thus preventing the escape of fluid from the chamber 25 to the chamber 29 through the crevices 49—49.

The indirect baking of the enamel produces a more uniformly baked coating than direct flame baking. Small variations in the amount of fuel carried up by the wire, due to particles of grease, copper slivers or the like, does not produce corresponding variations in the baking since the wire is shielded from the direct flame. The shielding of the wire from the direct flame also prevents deposits of condensed gums, soot and carbonized materials on the enamel coating.

It will be evident that the embodiments of the invention here shown are illustrative only and may be modified in many ways without departing from the spirit and scope of the invention as pointed out and described in the appended claims.

What is claimed is:

1. In an apparatus for treating filiform cores having thereon material containing a volatile combustible ingredient, an oven through which the core passes having a tubular vaporizing zone, a tubular baking zone aligned therewith, a combustion chamber associated with the baking zone, and means interposed between the vaporizing zone and the baking zone to transfer vapors from the vaporizing zone to the combustion chamber, said means comprising a manifold and inspirators to transfer the vapors and an auxiliary manifold to supply additional gaseous material to the vapors.

2. In an apparatus for treating filiform cores having thereon material containing a volatile combustible ingredient, an oven through which the core passes having a tubular vaporizing zone, a tubular baking zone aligned therewith, a combustion chamber associated with the baking zone, and means interposed between the vaporizing zone and the baking zone to transfer vapors from the vaporizing zone to the combustion chamber, said means comprising a manifold and inspirators to transfer the vapors, an auxiliary manifold to supply additional gaseous material to the vapors, and supply pipes for the two manifolds passing through the combustion chamber to be heated therein.

3. In an apparatus for treating filiform cores having thereon material containing a volatile combustible ingredient, an oven through which the core passes having a tubular vaporizing zone, a tubular baking zone aligned therewith, a combustion chamber associated with the baking zone, and means interposed between the vaporizing zone and the baking zone to transfer vapors from the vaporizing zone to the combustion chamber, said means comprising a removable manifold and inspirators to transfer the vapors and an auxiliary manifold removable therewith.

4. In an apparatus for heat treating filiform cores, a tubular oven comprising a tubular casing having a constricted portion wherein a preliminary stage of the heat treatment is performed and having an expanded portion wherein a final stage of the heat treatment is performed, unitary means removably positioned in the said expanded portion for carrying on said final stage of the heat treatment including a base member, and a seal of granular heat resistant material between said base member and said expanded portion.

5. In an apparatus for treating filiform cores, an oven having a tubular passage therethrough through which the cores may be passed, a laterally enlarged portion in the wall of the tubular passage, an inspirator nozzle extending across the enlarged portion, and a combustion chamber surrounding the tubular passage above the enlarged portion, said combustion chamber having an inlet in alignment with the inspirator nozzle.

6. In an apparatus for treating filiform cores, an oven having a tubular passage therethrough through which the cores may be passed, a vapor intake in the wall of the passage comprising a laterally enlarged portion, and an inspirator nozzle in the enlarged portion, a combustion chamber surrounding the tubular passage above the vapor intake, and an inspirator tube extending from the vapor intake into the combustion chamber.

7. In an apparatus for treating filiform cores, an oven having a tubular passage therethrough through which the cores may be passed, a vapor intake in the wall of the passage comprising a laterally enlarged portion and an inspirator nozzle in the enlarged portion, a combustion chamber surrounding the tubular passage above the vapor intake, an inspirator tube extending from the vapor intake into the combustion chamber, and a gas chamber surrounding the inspirator tube, said gas chamber having an outlet opening around the tube.

8. In an apparatus for treating filiform cores, a tubular oven comprising a casing having a restricted and expanded portion, means for heating the restricted portion to form a vaporizing zone, means insertable in the expanded portion comprising a tubular member for dividing the expanded portion into combustion and baking zones, and means for directing vaporized gases from the vaporizing zone to the combustion zone.

9. In an apparatus for treating filiform cores, a tubular oven comprising a casing having a restricted and expanded portion, means for heating the restricted portion to form a vaporizing zone, means insertable in the expanded portion comprising a tubular member for dividing the expanded portion into combustion and baking zones, and means for mixing air with vaporized gases and directing the mixture into the combustion zone.

10. In an apparatus for treating filiform cores, a tubular oven comprising a casing having a restricted and expanded portion, means for passing a strand coated with a compound having a vaporizable and combustible ingredient, means for heating the restricted portion to constitute a vaporizing zone, means insertable in the expanded portion comprising a tubular member for dividing the expanded portion into a baking chamber surrounding the core and a combustion chamber separate therefrom, and means for directing vaporized gases from the vaporizing zone to the combustion chamber.

11. In an apparatus for treating moving filiform cores coated with a compound having a vaporizable and combustible ingredient, a vaporizing chamber for vaporizing said ingredient, a baking chamber surrounding the core and spaced from the vaporizing chamber in the direction of movement of the core, a combustion chamber surrounding the baking chamber and separated therefrom, and means for transferring vapors from the vaporizing chamber to the combustion chamber.

HAL F. FRUTH.
RAYMOND L. READING.